G. STOVEL.
Gate.
No. 46,954.
Patented March 21, 1865.
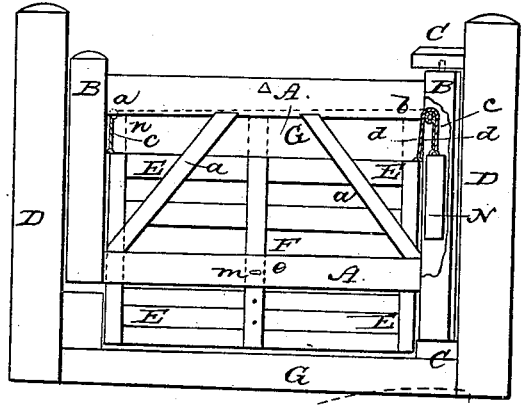
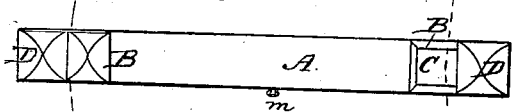
Fig. 2
Witnesses
W. E. Wans.
F. Hamsworth
Inventor
George Stovel.

UNITED STATES PATENT OFFICE.

GEORGE STOVEL, OF CHICAGO, ILLINOIS.

IMPROVEMENT IN GATES.

Specification forming part of Letters Patent No. 46,954, dated March 21, 1865.

*To all whom it may concern:*

Be it known that I, GEORGE STOVEL, of Chicago, in the county of Cook and State of Illinois, have invented a new and useful Improvement in Gates; and I do hereby declare that the following is a full, clear, and exact description thereof, reference being had to the accompanying drawings and the letters and figures marked thereon, which form part of this specification.

In the said drawings, Figure 1 represents a side elevation of my invention, and Fig. 2 is a plan or top view of the same.

The nature of my invention consists in hanging a horizontally-swinging gate at such a height from the ground that the opening and closing thereof will not be impeded or prevented by the snow which may lie upon the ground, and employing in combination therewith a vertically-adjustable gate for the purpose of closing the space between the lower part of the swinging gate and the ground or surface of the snow.

To enable those skilled in the art to understand the construction and operation of my invention, I will proceed to describe the same with particularity, reference being made to the aforesaid drawings.

D D represent the ordinary upright posts arranged at each end of the gate, to one of which the gate is attached by suitable hinges or supports. C C, the upper and lower ends of B resting in suitable bearings in said supports.

The vertical timbers B B are connected by the cross-bars A A, and these are firmly braced and strengthened by the braces *a*. A A B B thus constitute the swinging gate, the lower part being at a considerable distance from the ground, whose surface is represented at the upper side of G. Through the lower cross-bar A there is a vertical slot extending throughout its entire length, through which is suspended the vertically-adjustable gate (marked E) upon the cords *c d*, passing over the pulleys *n b*, as shown, and attached to the weight W, which moves up and down in a recess in the upright B, as shown. Thus it is readily seen that while the said gate E has an independent vertical reciprocating movement within the gate A B it also partakes of the swinging motion of the latter in opening and closing, and the two together constitute a single gate; and by means of the hole *e* in the lower cross-bar A, a vertical series of holes in the vertical slat F upon the gate E, and the pin *m* the said gate E may be adjusted and fixed in any position to adapt it to the depth of the snow upon the ground, and thus the space below the swinging gate is completely closed at all times, while it does not interfere in the least degree with the opening or closing of the same.

Having thus fully described the nature, construction, and operation of my improved gate, I will now specify what I claim as new therein and desire to secure by Letters Patent.

I claim—

The combination and arrangement of the swinging gate A B, with the vertically-adjustable gate E, operating substantially as and for the purposes herein specified and shown.

GEORGE STOVEL.

Witnesses:
  W. E. MARRS,
  F. HAINSWORTH.